Oct. 18, 1966  A. J. SKALKA  3,279,078
GRAIN BIN FILL GAUGE
Filed Aug. 18, 1964  3 Sheets-Sheet 1
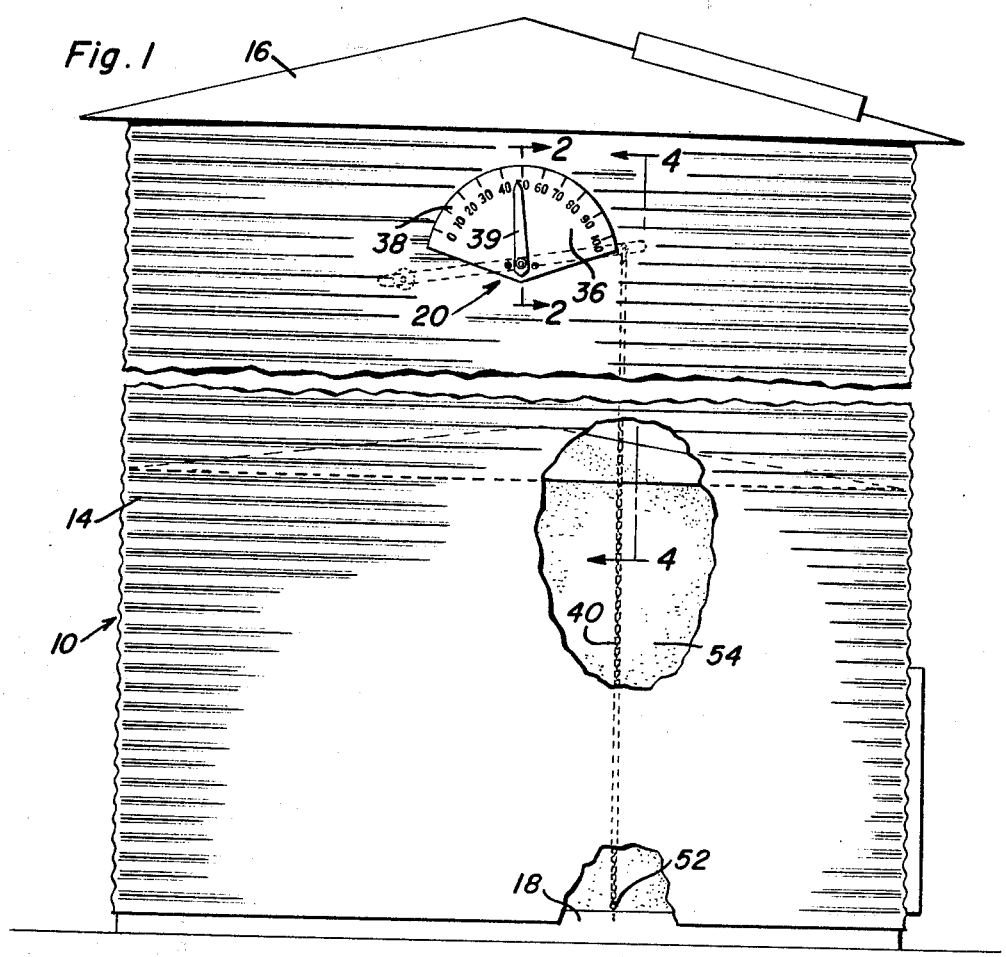
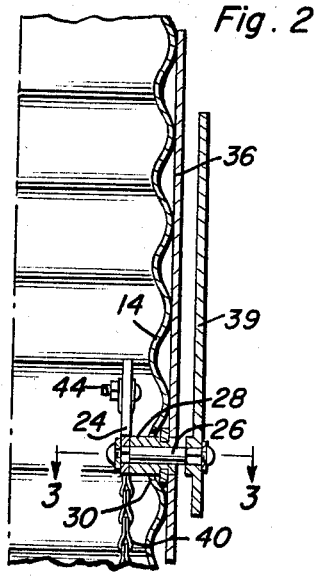
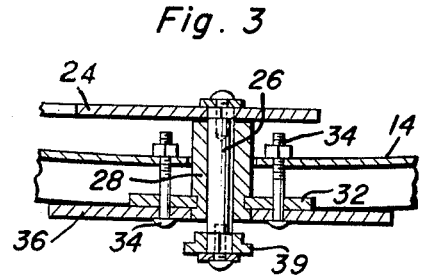
Albert J. Skalka
INVENTOR.

Oct. 18, 1966
A. J. SKALKA
3,279,078
GRAIN BIN FILL GAUGE
Filed Aug. 18, 1964
3 Sheets-Sheet 2
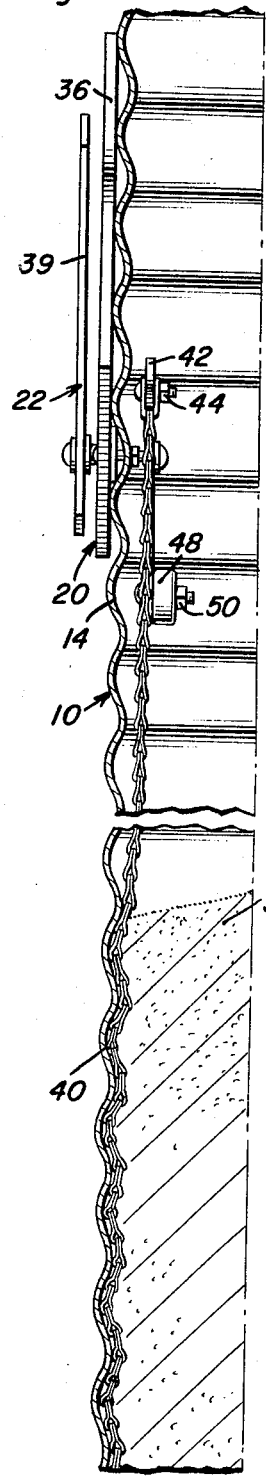
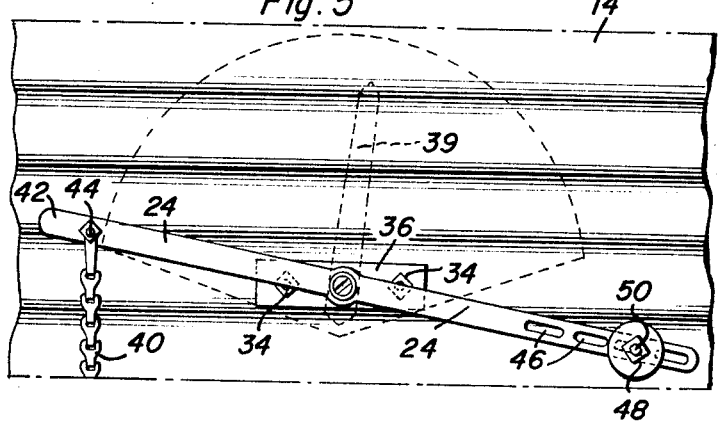
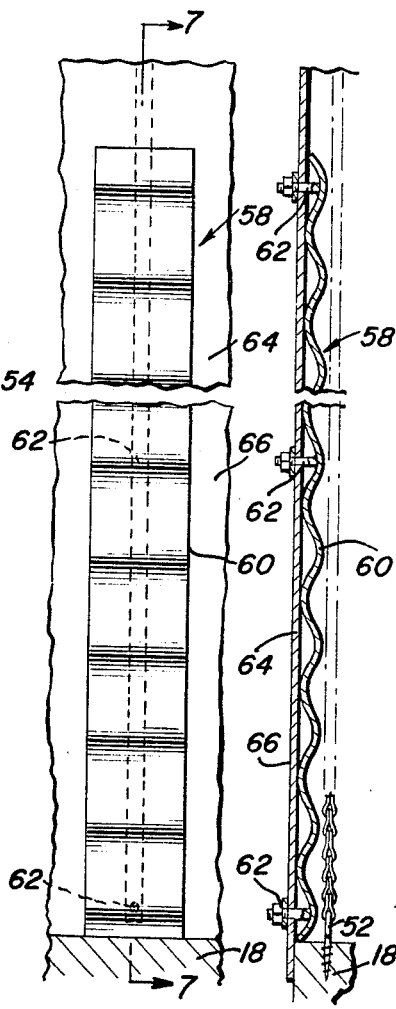
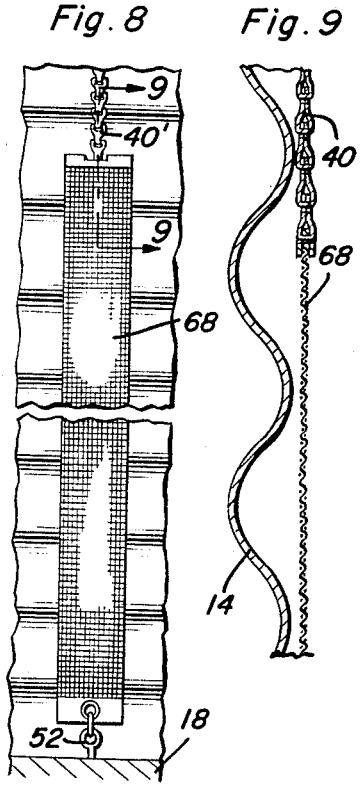
Albert J. Skalka
INVENTOR.

Oct. 18, 1966
A. J. SKALKA
3,279,078
GRAIN BIN FILL GAUGE
Filed Aug. 18, 1964
3 Sheets-Sheet 3
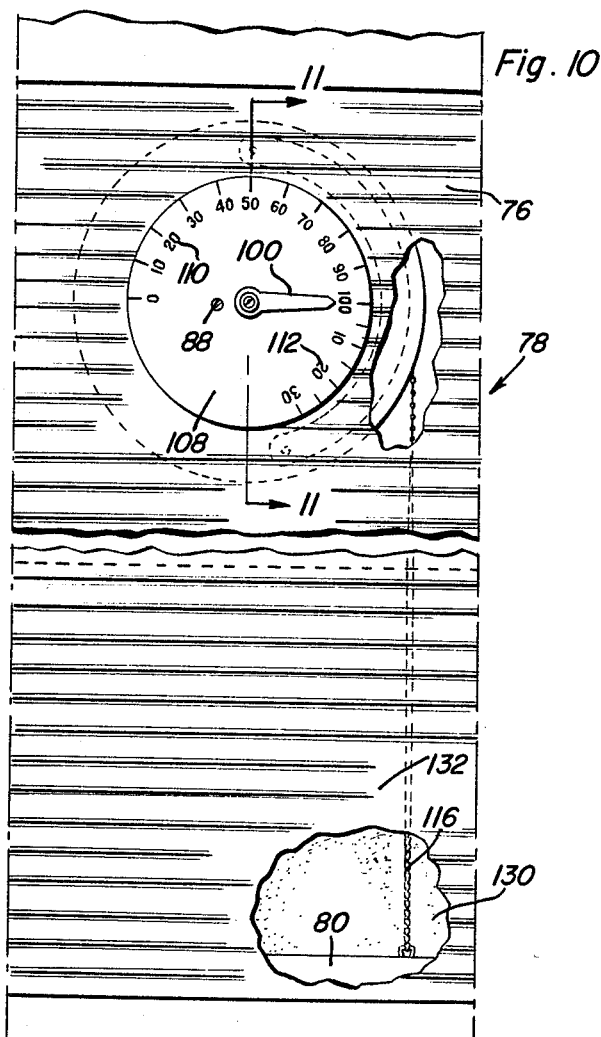
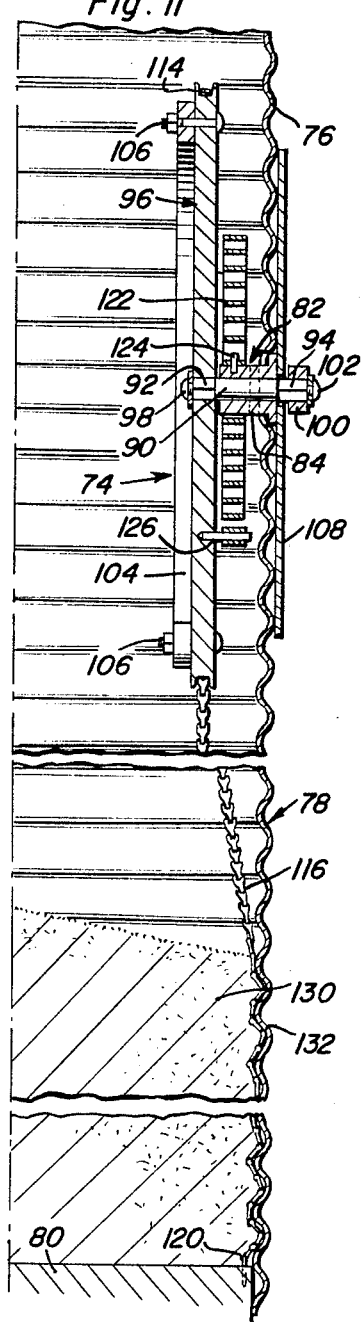
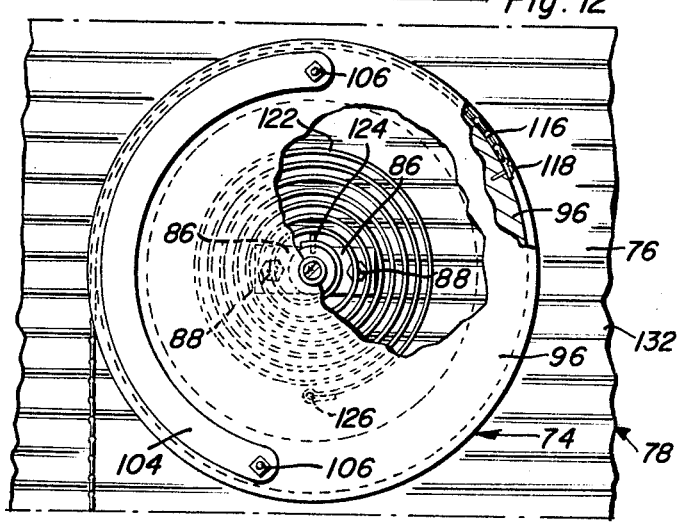
Albert J. Skalka
INVENTOR.
BY *Clarence A. O'Brien*
*and Harvey B. Jackson*
Attorneys

United States Patent Office 3,279,078
Patented Oct. 18, 1966

3,279,078
GRAIN BIN FILL GAUGE
Albert J. Skalka, Deweese, Nebr.
Filed Aug. 18, 1964, Ser. No. 390,282
15 Claims. (Cl. 33—126)

This invention relates to a novel and useful apparatus and more specifically to a device designed primarily for attachment to a grain bin and for utilization in rendering a visual indication of the amount of grain stored within the bin.

The main object of this invention is to provide a grain bin fill gauge constructed in a manner so as to be readily adaptable for rendering an accurate indication of the amount of grain within a grain storage bin.

Another object of this invention is to provide a grain bin full gauge constructed in a manner whereby it may be operatively mounted on substantially all types of grain bins in a manner such that the indicating portion thereof will be disposed exteriorly of the grain bin and thereby operable to render a visual indication of the amount of grain disposed within the bin.

The grain bin fill gauge of the instant invention is, in its simplest form, designed for use in conjunction with grain bins constructed of horizontally corrugated sheet metal panels. However, it is a further object of this invention to provide a grain bin fill gauge constructed in accordance with the preceding objects and which may be utilized in grain bins which do not include corrugated wall panels.

Still another object of this invention is to provide a grain bin fill gauge in accordance with the preceding objects which will, in addition to indicating to what extent a grain bin has been filled, indicate the amount the grain in a bin has shrunk due to drying after the bin has been filled.

A final object of this invention to be specifically enumerated herein is to provide a grain bin fill gauge in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a conventional form of grain bin including corrugated side walls and with the grain bin fill gauge of the instant invention operatively supported from an upper portion of the grain bin and portions of the grain bin being broken away and shown in section;

FIGURE 2 is an enlarged fragmentary vertical sectional view taken substantially upon the plane indicated by the section line 2—2 of FIGURE 1;

FIGURE 3 is a fragmentary horizontal sectional view taken substantially upon the plane indicated by the section line 3—3 of FIGURE 2;

FIGURE 4 is an enlarged fragmentary vertical sectional view taken substantially upon the plane indicated by the section line 4—4 of FIGURE 1;

FIGURE 5 is a fragmentary elevational view of the portion of the grain bin fill gauge secured to the upper end of the grain bin as seen from the inside of the latter;

FIGURE 6 is a fragmentary elevational view of a portion of a modified form of grain bin as seen from the inside thereof and with an adapter attachment of the instant invention operatively supported from the grain bin;

FIGURE 7 is a fragmentary vertical sectional view taken substantially upon the plane indicated by the section line 7—7 of FIGURE 6;

FIGURE 8 is a fragmentary elevational view showing a modified form of tension member;

FIGURE 9 is an enlarged fragmentary vertical sectional view taken substantially upon the plane indicated by the section line 9—9 of FIGURE 8;

FIGURE 10 is a fragmentary side elevational view similar to FIGURE 1 but illustrating a modified form of gauge;

FIGURE 11 is a fragmentary enlarged vertical sectional view taken substantially upon the plane indicated by the section line 11—11 of FIGURE 10; and FIGURE 12 is an enlarged fragmentary side elevational view of the gauge in FIGURE 11 with parts broken away and shown in section.

Referring now more specifically to the drawings, the numeral 10 generally designates a conventional form of grain bin including horizontally corrugated cylindrical side walls 14 and a top 16. The bin 10 also includes a base 18 from which the lower ends of the cylindrical side walls 14 are supported.

The grain bin fill gauge of the instant invention is generally referred to by the reference numeral 20 and includes motion-responsive indicating means generally referred to by the reference numeral 22 including a lever arm 24 pivotally secured to a portion of the side walls 14 by means of a shaft portion 26 projecting laterally from the lever 24 and rotatably journaled through a sleeve 28 extending through an aperture 30 formed in the side wall 14 and secured to the side wall 14 by means of a mounting plate 32 supported from the sleeve 28 and mounted on the side wall 14 by means of suitable fasteners 34 secured through the mounting plate 32 and the side wall 14.

A sector plate 36 is also supported from the side walls 14 by means of the fasteners 34 and has a plurality of indicia 38 formed thereon with which a pointer 39 supported from the end of the shaft 26 remote from the lever 24 is registrable.

From FIGURE 5 of the drawings it may be seen that the upper end of an elongated flexible tension member 40 is pivotally secured to one end portion 42 of the lever 24 by means of a fastener 44. In addition, it may be seen that the remote end of the lever 24 is provided with a plurality of longitudinally spaced slots 46 and that a counterbalance weight 48 is supported from the lever 24 by means of a fastener 50 passing through the weight 48 and one of the slots 46.

The tension member extends down to the bottom of the bin 10 and is secured to the base 18 by means of an anchor member 52. As can best be seen from FIGURE 4 of the drawings, as grain 54 is added to the bin 10, portions of the tension member 40 disposed below the upper level of the grain 54 are laterally deflected so as to conform to the corrugations in the sides 14 of the bin 10. The lateral displacement of numerous portions of the tension member 40 appreciably reduces its effective length and therefore effects a downward pull on the end portion 42 of the lever 24. This in turn effects angular displacement of the pointer 40 and thereby indicates an increase in the amount of grain 54 disposed within the bin 10. It is to be noted that the counterbalance weight 48 is sufficient to overcome the weight of the elongated flexible member 40.

With attention now directed to FIGURES 6 and 7 of the drawings, there will be seen an attachment for the grain bin fill gauge 20 which is generally designated by the reference numeral 58 and which includes an elongated upstanding corrugated panel 60. The panel 60 includes a plurality of fasteners 62 by which it may be secured to the inner surfaces of a modified form of grain bin 64 including smooth side walls 66. The attachment 58 therefore comprises a substitute for the corrugated side walls 14 of the bin 10 and it is to be noted that the tension member 40 will operate in conjunction with the attachment 58 in the same manner in which it operates in conjunction with the corrugated side walls 14 of the bin 10.

With attention now directed to FIGURES 8 and 9 of the drawings, there will be seen a modified form of tension member 40' which includes an elongated flexible panel-like lower end portion 68. The panel-like lower end portion 68 is utilized so as to reduce the possibility of particles of the grain 54 from becoming disposed between the lower end portion 68 and the corrugated side wall 14 such as could be the case if the tension member 40 were utilized. However, it is to be noted that the tension member 40 will operate completely satisfactorily when certain larger types of grain are disposed within the bin 10. However, should a small type of grain be disposed in the bin 10, it would be advantageous to utilize the lower end portion 68 so as to minimize any tendency of the smaller particles of grain being disposed between the tension member and the corrugated side walls of the bin 10. If particles of grain did become lodged between the tension member and the side walls of the associated bin, the tension member would not be as greatly laterally deflected and therefore the associated pointer corresponding to the pointer 40 would render an inaccurate reading.

In any event, it may be seen that the grain bin fill gauge 20 of the instant invention is fully operative for the purpose of rendering a visual indication of the amount of grain 54 disposed within the bin 10, which indication can be viewed from the exterior of the bin 10.

With attention now directed more specifically to the modified form of grain bin fill gauge illustrated in FIGURES 10-12 of the drawings, it may be seen that the modified form of grain bin fill gauge is generally designated by the reference numeral 74 and that the fill gauge 74 is shown supported from the upstanding corrugated side wall portion 76 of a grain bin generally referred to by the reference numeral 78. The grain bin 78 includes a bottom 80 and the gauge 74 may be seen to include a mounting bracket generally referred to by the reference numeral 82 in the form of a generally cylindrical sleeve 84 provided with apertured mounting lug portions 86 which are secured to the outer surface of the side wall portion 76 of the grain bin 78 by means of suitable fasteners 88.

A shaft portion 90 corresponding to the shaft portion 26 is rotatably journaled through the sleeve 84 and includes opposite end non-circular terminal end portions 92 and 94. A lever arm disk 96 is secured on the end portion 92 by means of a suitable fastener 98 and a pointer 100 corresponding to the pointer 39 is secured on the end portion 94 by means of a fastener 102. An arcuate weight 104 is secured to the inner face of the disk 96 in any convenient manner such as by fasteners 106 and a dial plate 108 corresponding to the plate 36 is secured to the outer surface of the side wall portion 76 by means of the fasteners 88. The plate 108 includes first indicia 110 which comprise numerals beginning with zero and extending up to 100 and also second indicia 112 continuing from 100 of the first indicia 110 and extending from 10 to 30. The pointer 100 is registrable with the first indicia 110 to indicate the percentage of the maximum capacity of the bin 78 which is filled with grain. The second indicia 112 is to indicate the percentage of shrinkage of grain once the grain bin 78 has been filled to its capacity.

The outer periphery of the disk 96 is provided with a circumferentially extending and radially outwardly opening groove 114 in which one end of a pull chain 116 is secured as at 118. The pull chain 116 extends about the disk 96 and extends downwardly from the latter and is secured to the bottom 80 of the bin 78 as at 120. In addition, one end of a coil spring 122 is secured to the sleeve 84 as at 124 while the other end of the coil spring 122 is secured to the disk 96 as at 126.

In operation, the grain bin gauge 74 is positioned as indicated in FIGURE 12 of the drawings when the bin 78 is empty. However, as the bin 78 is filled to its capacity with grain 130, the pull chain 116 is laterally deflected into the corrugations 132 of the side wall 76 of the grain bin 78. This lateral deflection of the pull chain 116 shortens its effective length and thereby causes a downward pull to be exerted on the upper end of the chain 116 and rotation of the disk 96 from the position illustrated in FIGURE 12 of the drawings wherein the pointer indicates that the grain bin 78 is empty to the position illustrated in FIGURE 10 of the drawings wherein the pointer 100 indicates that the grain bin 78 is 100% full. Initially, the weight 104 is sufficient to counterbalance the weight of the pull chain 116 when the bin 78 is empty. As the grain bin 78 is slowly filled, the weight of the suspended portion of the pull chain 116 is gradually reduced and the weight 104 swings to a position centered above the axis of rotation of the shaft portion 90 when the grain bin 78 is one-half full. However, at this point the tension of the coil spring 122 is increased to the point that continued rotation of the weight 104 in a clockwise direction as viewed in FIGURE 10 of the drawings to the position illustrated in FIGURE 10 of the drawings will enable the tension of the coil spring 122 to counterbalance the weight 104.

Actually, throughout the rotation of the disk 96 from the position illustrated in FIGURE 12 of the drawings to the position illustrated in FIGURE 10 of the drawings, the free suspended portion of the chain 116 is continuously slightly underbalanced in order that the downward pull of the chain 116 will always be slightly overbalanced by means of the portions of the gauge 74 supported from the shaft portion 90.

After the grain bin 78 has been completely filled to the level illustrated in FIGURES 10 and 11 of the drawings and the pointer 100 indicates that the grain bin 78 is 100% full, should any shrinkage occur in the grain 130 due to moisture being removed from the grain 130 by drying process, the shrinkage of the grain 130 will cause a slow shifting of the grain downward in the bin 78 and the frictional engagement of the grain 130 with the pull chain 116 covered by the grain 130 will exert a further downward pull on the chain 116 and thus cause the disk 96 to further rotate in a clockwise direction. When the pointer 100 is registered with the indicia 112, the indicia 112 with which the pointer 100 is registered will indicate the percentage of the shrinkage of the grain 130.

In addition tot he modified form of grain bin gauge 74 being adapted to indicate shrinkage in the grain 130 once the grain bin 78 has been filled, the fill gauge 74 may also include the modified forms of pull chains illustrated in FIGURES 6-9 of the drawings.

The foregoing is considered as illustrative only of the principles of the invention. Further, since numerous modifications and changes will readily occur to those skilled in the art, is is not desired to limit the invention to the exact construction and operation shown and described, and accordingly all suitable modifications and equivalents may be resorted to, falling within the scope of the invention as claimed.

What is claimed as new is as follows:

1. In combination, a bin for fluent granular material and including a side wall having one upstanding portion which includes horizontal corrugations, a grain bin fill gauge comprising motion-responsive indicating means movably secured to an upper portion of the bin, an elongated flexible tension member having one end secured to said motion-responsive means and the other end depending downwardly from said motion-responsive means, means carried by the lower end of said tension member securing said lower end within the bottom of said bin against vertical movement therein, said indicating means including means operative in response to downward movement of the upper end portion of said tension member for proportionally varying the indication rendered thereby, said tension member being disposed adjacent and extending downwardly along said upstanding portion and having sufficient lateral area parallel to said upstanding portion, whereby when grain is placed in said bin portions of said tension member disposed below the level of said grain will be laterally deflected by the side pressure of said grain into the corrugations of said upstanding portion and the effective length of said tension member will be reduced so as to effect downward movement of the upper end portion of said tension member disposed above said grain and a corresponding change in the indication rendered by said indicating means.

2. The combination of claim 1 wherein said indicating means includes a lever arm, said mounting means including means adapted to pivotally secure said lever arm to said bin for rotation about a horizontal axis extending transversely of said lever arm intermediate the opposite ends thereof, said one end of said tension member being secured to one end portion of said lever arm disposed on one side of said axis.

3. The combination of claim 2 including indicia-defining means adapted for fixed support from said bin and registry with a pointer secured to and swingable with said lever arm.

4. The combination of claim 1 wherein said indicating means includes a lever arm, said mounting means including means adapted to pivotally secure said lever arm to said bin for rotation about a horizontal axis extending transversely of said lever arm intermediate the opposite ends thereof, said one end of said tension member being secured to one end portion of said lever arm disposed on one side of said axis, said mounting means including a sleeve member adapted to be secured through one wall portion of said bin and a spindle carried by said lever arm and extending laterally outwardly from one side thereof and journaled through said sleeve.

5. The combination of claim 4 including a pointer carried by the end portion of said spindle projecting outwardly of said sleeve and remote from said lever arm, and indicia-defining means adapted for fixed support from the exterior of said bin and registry with said pointer.

6. The combination of claim 1 wherein said indicating means includes a lever arm, said mounting means including means adapted to pivotally secure said lever arm to said bin for rotation about a horizontal axis extending transversely of said lever arm intermediate the opposite ends thereof, said one end of said tension member being secured to one end portion of said lever arm disposed on one side of said axis, said lever arm being adapted to be generally horizontally disposed and including weight means on said other end portion thereof over counterbalancing the weight of said tension member.

7. The combination of claim 1 wherein at least the lower end portion of said tension member comprises a strap-like member.

8. The combination of claim 1 wherein said indicating means includes means for slightly under counterbalancing the weight of the free suspended portion of said flexible tension member.

9. The combination of claim 8 wherein said means for slightly under counterbalancing the free suspended portion of said flexible tension member includes means adapted to gradually decrease the counterbalancing action thereof on said tension member as said grain bin is filled.

10. In combination, a bin for fluent granular material, a grain bin fill gauge comprising motion-responsive indicating means movably supported from said bin, an elongated, upstanding, and flexible tension member having its upper end portion secured to said motion-responsive means and its lower end portion secured within the bottom of said bin against vertical movement therein, said indicating means including means, operative in response to downward movement of the upper end portion of said tension member, for proportionally varying the indication rendered thereby, an elongated upstanding panel-like member stationarily positioned relative to said bin and including one side face disposed in said bin and defining a plurality of longitudinally spaced projections and recesses, said tension member being disposed adjacent and extending along said one side face and having sufficient lateral area parallel to said one side face whereby when grain is disposed in said bin portions of said tension member disposed below the level of said grain will be laterally deflected by the side pressure of said grain into said recesses and the effective length of said tension member will be reduced so as to effect downward movement of the upper end portion of said tension member disposed above said grain and a corresponding change in the indication rendered by said indicating means.

11. The combination of claim 10 wherein at least the lower end portion of said tension member comprises a strap-like member.

12. The combination of claim 10 wherein said indicating means includes a lever arm, said mounting means including means adapted to pivotally secure said lever arm to said bin for rotation about a horizontal axis extending transversely of said lever arm intermediate the opposite ends thereof, said one end portion of said tension member being secured to one end portion of said lever arm disposed on one side of said axis.

13. The combination of claim 10 wherein said indicating means includes a lever arm, said mounting means including means adapted to pivotally secure said lever arm to said bin for rotation about a horizontal axis extending transversely of said lever arm intermediate the opposite ends thereof, said one end portion of said tension member being secured to one end portion of said lever arm disposed on one side of said axis, said mounting means including a sleeve member adapted to be secured through one wall portion of said bin and a spindle carried by said lever arm and extending laterally outwardly from one side thereof and journaled through said sleeve.

14. The combination of claim 13 including a pointer carried by the end portion of said spindle projecting outwardly of said sleeve and remote from said lever arm, and indicia-defining means adapted for fixed support from the exterior of said bin and registry with said pointer.

15. The combination of claim 14 wherein said indicating means includes a lever arm, said mounting means including means adapted to pivotally secure said lever arm to said bin for rotation about a horizontal axis extending transversely of said lever arm intermediate the opposite ends thereof, said one end portion of said tension member being secured to one end portion of said lever arm disposed on one side of said axis, said lever arm being adapted to be generally horizontally disposed and including weight means on said other end portion thereof over counterbalancing the weight of said tension member.

No references cited.

LEONARD FORMAN, *Primary Examiner.*